United States Patent
Li et al.

(10) Patent No.: US 11,080,897 B2
(45) Date of Patent: Aug. 3, 2021

(54) SYSTEMS AND METHODS FOR A PET IMAGE RECONSTRUCTION DEVICE

(71) Applicant: NEUSOFT MEDICAL SYSTEMS CO., LTD., Shenyang (CN)

(72) Inventors: Yunda Li, Shenyang (CN); Zhipeng Sun, Shenyang (CN); Shaolian Liu, Shenyang (CN)

(73) Assignee: Neusoft Medical Systems Co., Ltd., Shenyang (CN)

( * ) Notice: Subject to any disclaimer, the term of this patent is extended or adjusted under 35 U.S.C. 154(b) by 170 days.

(21) Appl. No.: 16/057,533

(22) Filed: Aug. 7, 2018

(65) Prior Publication Data

US 2019/0043226 A1 Feb. 7, 2019

(30) Foreign Application Priority Data

Aug. 7, 2017 (CN) .......................... 201710668011.0

(51) Int. Cl.
*G06T 11/00* (2006.01)
*G06T 5/50* (2006.01)
(Continued)

(52) U.S. Cl.
CPC ............ *G06T 11/008* (2013.01); *G06T 5/002* (2013.01); *G06T 5/50* (2013.01); *G06T 7/13* (2017.01);
(Continued)

(58) Field of Classification Search
None
See application file for complete search history.

(56) References Cited

U.S. PATENT DOCUMENTS

2005/0041843 A1* 2/2005 Sawyer ................. G06T 7/0012
382/128
2006/0233430 A1* 10/2006 Kimura ..................... G06T 7/30
382/128
(Continued)

FOREIGN PATENT DOCUMENTS

CN 102920470 A 2/2013
CN 103559728 A 2/2014
(Continued)

OTHER PUBLICATIONS

Guo Di, Chinese Patent Publication CN105469364A, Available online Apr. 6, 2016, Medical image fusion method combined with wavelet transformation domain and spatial domain, Google Translation attached Jun. 7, 2020. (Year: 2016).*

(Continued)

*Primary Examiner* — Tahmina N Ansari
(74) *Attorney, Agent, or Firm* — McCoy Russell LLP (57) ABSTRACT

Methods, devices and apparatus for reconstructing a PET image are provided. According to an example of the method, a PET initial image may be reconstructed from PET data obtained by scanning on a target object with a PET device, and an MRI image may be reconstructed from MRI data obtained by scanning on the target object with a MRI device, a fusion image retaining only a boundary of the target object is generated based on the PET initial image and the MRI image, and a PET reconstructed image is obtained by combining the PET initial image with the fusion image, where the definition of the boundary of the target object in the PET reconstructed image is higher than that in the PET initial image.

16 Claims, 6 Drawing Sheets

(51) Int. Cl.
*G06T 7/33* (2017.01)
*G06T 7/13* (2017.01)
*G06T 5/00* (2006.01)

(52) U.S. Cl.
CPC .... *G06T 7/337* (2017.01); *G06T 2207/10088* (2013.01); *G06T 2207/10104* (2013.01); *G06T 2207/20016* (2013.01); *G06T 2207/20064* (2013.01); *G06T 2207/20192* (2013.01); *G06T 2207/20221* (2013.01); *G06T 2207/30004* (2013.01); *G06T 2207/30096* (2013.01)

(56) References Cited

U.S. PATENT DOCUMENTS

| | | | |
|---|---|---|---|
| 2008/0008369 | A1* | 1/2008 | Koptenko ................. G06T 7/12 382/128 |
| 2011/0135185 | A1* | 6/2011 | Gkanatsios ............ A61B 6/463 382/132 |

FOREIGN PATENT DOCUMENTS

| | | | |
|---|---|---|---|
| CN | 102573636 | B | 8/2014 |
| CN | 105469364 | A * | 4/2016 |
| CN | 105469364 | A | 4/2016 |
| CN | 105574834 | A | 5/2016 |
| CN | 106691486 | A | 5/2017 |

OTHER PUBLICATIONS

Mallat, S., "A Theory for Multiresolution Signal Decomposition: The Wavelet Representation," IEEE Transactions on Pattern Analysis and Machine Intelligence, vol. 11, No. 7, Jul. 1989, 20 pages.

Alenius, S. et al., "Bayesian image reconstruction for emission tomography based on median root prior," European Journal of Nuclear Medicine, vol. 24, No. 3, Mar. 1997, 8 pages.

Hsiao, I. et al., "A New Convex Edge-Preserving Median Prior with Applications to Tomography," IEEE Transactions on Medical Imaging, vol. 22, No. 5, May 2003, 17 pages.

Tao, G. et al., "Medical Image Fusion Based on Wavelet Transforms and 3D Reconstruction Based on a Searching Algorithm of Volume Data," Journal of Zhejiang Wanli University, vol. 16, No. 4, Oct. 2003, 5 pages. (Submitted with English Abstract).

Tao, H. et al., "Super resolution Remote Sensing Image Processing Algorithm Based on Wavelet Transform and Interpolation," Proceedings of the Third International Asia-Pacific Environmental Remote Sensing of the Atmosphere, Ocean, Environment, and Space, Oct. 23, 2002, Hangzhou, China, 6 pages.

Wei, Z., "Application Study of Compressed Sensing in Image Processing," Master of Engineering Thesis, Shanghai Jiao Tong University, School of Aeronautics and Astronautics, Feb. 2012, 73 pages.

Jianbao, L. et al., "A UWB through-the-wall multiple view imaging fusion algorithm" Journal of Guilin University of Electronic Technology, vol. 31, No. 6, Dec. 31, 2011, 5 pages. (Submitted with English Abstract).

Xin, J., "The research of edge completion in Hyperspectral imaging fusion" China Master's Theses Full-text Database, Chapter 5, Jul. 15, 2012, 20 pages. (Submitted with English Abstract).

State Intellectual Property Office of the People's Republic of China, Office Action and Search Report Issued in Application No. 201710668011.0, dated Jul. 2, 2019, 15 pages. (Submitted with Partial Translation).

* cited by examiner

SYSTEMS AND METHODS FOR A PET IMAGE RECONSTRUCTION DEVICE

CROSS REFERENCE TO RELATED APPLICATION

This application claims priority to Chinese Patent Application No. 201710668011.0 filed on Aug. 7, 2017, the entire contents of which is incorporated herein by reference in its entirety for all purposes.

BACKGROUND

Positron Emission Tomography (PET) is an advanced imaging technology for clinical examination in the field of nuclear medicine. Multi-modal medical images may provide more detailed information of images, and thus are widely applied in clinical diagnosis and treatment now. For example, Magnetic Resonance Imaging (MRI) images obtained by MRI technology have a high resolution and spatial texture information. Research shows that there is a great correlation between an MRI image and a PET image for same part of same patient, so that the MRI image with a high resolution can provide a large amount of prior information for PET image reconstruction. Therefore, the PET image reconstruction may be performed by adopting an MRI-image-based joint prior model.

NEUSOFT MEDICAL SYSTEMS CO., LTD. (NMS), founded in 1998 with its world headquarters in China, is a leading supplier of medical equipment, medical IT solutions, and healthcare services. NMS supplies medical equipment with a wide portfolio, including CT, Magnetic Resonance Imaging (MRI), digital X-ray machine, ultrasound, Positron Emission Tomography (PET), Linear Accelerator (LINAC), and biochemistry analyser. Currently, NMS' products are exported to over 60 countries and regions around the globe, serving more than 5,000 renowned customers. NMS's latest successful developments, such as 128 Multi-Slice CT Scanner System, Superconducting MRI, LINAC, and PET products, have led China to become a global high-end medical equipment producer. As an integrated supplier with extensive experience in large medical equipment, NMS has been committed to the study of avoiding secondary potential harm caused by excessive X-ray irradiation to the subject during the CT scanning process.

DETAILED DESCRIPTION

A method of reconstructing a PET image by using an MRI-image-based joint prior model may specifically include as follows.

Firstly, a PET device may perform data correction for collected data and perform image reconstruction for the corrected PET data based on an iterative algorithm to obtain a PET initial image. Then, the PET device may perform a rigid registration for a pre-obtained MRI image and the PET initial image to obtain an MRI registered image. Then, a joint prior model is constructed according to the PET initial image and the MRI registered image to obtain a prior equation. The formula is shown as follows:

$$U(f, a) = \sum_{j=1}^{n} \sum_{k \in N_j} w_{kj} v(f_j, f_k, a_j, a_k), \quad (1)$$

where $U(f, a)$ is a prior term of the joint prior model, f refers to the PET initial image, a refers to the MRI registered image, $w_{kj}$ is a weight of a pixel j and a pixel k adjacent to the pixel j, n refers to a number of pixels in the PET initial image, $N_j$ refers to a number of pixels adjacent to the pixel j, $f_j$ refers to a pixel value of the pixel j in the PET initial image, $f_k$ is a pixel value of the pixel k adjacent to the pixel j in the PET initial image, $a_j$ is a pixel value of the pixel j in the MRI registered image, $a_k$ is a pixel value of the pixel k adjacent to the pixel j in the MRI registered image, and $v(f_j, f_k, a_j, a_k)$ is a joint potential function based on the MRI registered image.

The formula of $v(f_j, f_k, a_j, a_k)$ in the formula (1) may be calculated as follows.

$$v(f_j, f_k, a_j, a_k) = \sqrt{1 + \left(\frac{f_j - f_k}{\delta}\right)^2 + \left(\frac{a_j - a_k}{\eta}\right)^2} - 1, \quad (2)$$

where $\delta$ and $\eta$ are both threshold parameters.

An optimization equation with a constrained objective function may be obtained by a maximum a posteriori method as following equation (3).

$$\hat{f} = \arg\max_{f \geq 0}\{L(g \mid f) - \beta U(f, a)\}, \quad (3)$$

where $L(g|f)$ is a log-likelihood energy equation of PET data g, $\beta$ is a global parameter, and $U(f, a)$ is a prior term shown in the formula (1).

The following iteration equation (4) may be obtained by calculating the formula (3) based on a One-Step-Late (OSL) algorithm:

$$f_j^{new} = \frac{f_j^{old}}{\sum_i p_{i,j} + \beta \frac{\partial}{\partial f_j} U(f,a)\Big|_{f_j=f_j^{old}}} \sum_i \frac{p_{i,j} g_i}{\sum_j p_{i,j} f_j^{old} + r_i}, \quad (4)$$

where a new estimation value $f_j^{new}$ of the pixel j is obtained by updating an old estimation value $f_j^{old}$, $p_{i,j}$ refers to a probability that the i-th projection line (e.g. a ray received by the i-th detector unit) passes through the pixel j, $g_i$ refers to a projection data value of the i-th projection line detected by the i-th detector unit in the PET data g, $r_i$ refers to a scatter event and a random event corresponding to the i-th detector unit, and $$\frac{\partial}{\partial f_j} U(f,a)$$

is to obtain a partial derivative from the prior term shown in the formula (1).

The formula of the partial derivative of $$\frac{\partial}{\partial f_j} U(f,a)$$

is as follows.

$$\frac{\partial v(\Delta f_{jk}, \Delta a_{jk})}{\partial \Delta f_{jk}} = \frac{\delta^{-2} \Delta f_{jk}}{\sqrt{1 + \left(\frac{\Delta f_{jk}}{\delta}\right)^2 + \left(\frac{\Delta a_{jk}}{\eta}\right)^2}}, \quad (5)$$

where $\Delta f_{jk} = f_j - f_k$ and $\Delta a_{jk} = a_j - a_k$.

In the formula (4), firstly, the PET initial image is used as an estimation value $f_j^{old}$ of the first iteration, and then, $f_j^{new}$ obtained in an iteration is taken as $f_j^{old}$ for starting a next iteration, so that the next iteration is executed. The iteration is continued until a constraint condition is satisfied, and an image obtained after the iteration is stopped is a final PET reconstructed image.

Although the above joint potential function adopted by the joint prior model has an effect of smoothing and denoising the PET initial image, only a quadratic penalty term is simply introduced in the joint potential function, so that the final PET reconstructed image is blurred while image uniformity is improved. Further, in the joint potential function, only a quadratic potential function of a pixel and its adjacent pixel in the MRI registered image is calculated, which does not fully utilize a characteristic of a clear boundary of the MRI image, thereby resulting in that the definition of an organ boundary in the PET reconstructed image is not obviously improved. In addition, since the MRI image has a high image resolution and spatial texture information, the distribution of an organ metabolism region (e.g. a region within an organ boundary) may not be uniform in the MRI image. In this case, when the spatial texture information in the MRI image is introduced in the PET reconstructed image, the uniformity of the organ metabolism region in the PET reconstructed image may be deteriorated, thereby reducing the accuracy of determining a lesion region based on the PET reconstructed image.

To solve the above defects, the present disclosure provides a method of reconstructing a PET image. In the method, advantages of an MRI image are introduced in the reconstructing a PET image, that is, an organ boundary in a PET reconstructed image inherits a definition characteristic of the MRI image, and the organ metabolism region in the PET reconstructed image has particular uniformity at the same time, so that actual requirements of the PET reconstructed image for a clear organ boundary and a uniform metabolism region are satisfied, thereby eventually improving the quality of the PET reconstructed image.

An example of the present disclosure will be specifically described below.

Figure 1:
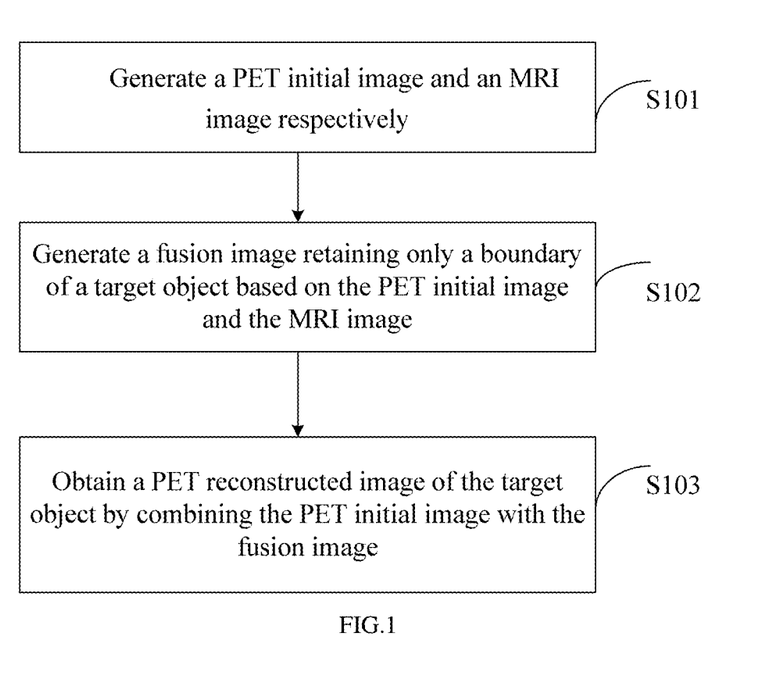
FIG. 1 is a flowchart illustrating a process of a method of reconstructing a PET image according to an example of the present disclosure.

FIG. 1 is a flowchart illustrating a process of a method of reconstructing a PET image according to an example of the present disclosure. The method may include block S101 to block S103.

At block S101, a PET initial image is reconstructed from PET data obtained by scanning on a target object with a PET device, and an MRI image is reconstructed from MRI data obtained by scanning on the target object with a MRI device.

In some examples, the target object is often an organ of a patient, such as lungs, a brain, and the like.

When performing image reconstruction on the target object, the MRI device may obtain a corresponding MRI image according to a magnetic resonance imaging technology.

When the PET device performs image reconstruction on the target object, assumed that detected PET projection data is Y and a PET initial image obtained by performing k iterations based on a common iteration algorithm, such as Maximum Likelihood Expectation Maximization (MLEM) and Algebra Reconstruction Technique (ART) is $X^k$, $X^k$ satisfies the formula $Y=PX^k$, where P refers to a system matrix. The calculation formula is as shown in formula (6).

$$X_j^k = \frac{X_j^{k-1}}{\sum_i P_{i,j}} \sum_i \frac{P_{i,j} Y_i}{\sum_j P_{i,j} X_j^{k-1}}, \quad (6)$$

where $X_j^k$ refers to a pixel value of the j-th pixel in the PET initial image after k iterations, $X_j^{k-1}$ refers to a pixel value of the j-th pixel in the PET initial image after k−1 iterations, $P_{i,j}$ refers to a probability that the i-th projection line (e.g. a ray received by the i-th detector unit) passes through the j-th pixel, and $Y_i$ refers to projection data corresponding to the i-th projection line.

At block S102, a fusion image retaining only a boundary of the target object is generated based on the PET initial image and the MRI image, where the definition of the boundary of the target object in the fusion image is higher than that in the PET initial image.

The boundary of the target object is a contour of the target object. According to an actual requirement of a PET reconstructed image, it is required that the boundary of the target object in the final PET reconstructed image has good definition. Therefore, in the example, a fusion image with only a clear target object boundary is obtained by pre-using the PET initial image and the MRI image. In some examples of the present disclosure, block S102 may specifically include block S1021 to block S1024, which are shown in a flowchart illustrating a process of a method of generating a fusion image with a clear boundary in FIG. 2A.

Figure 2A:
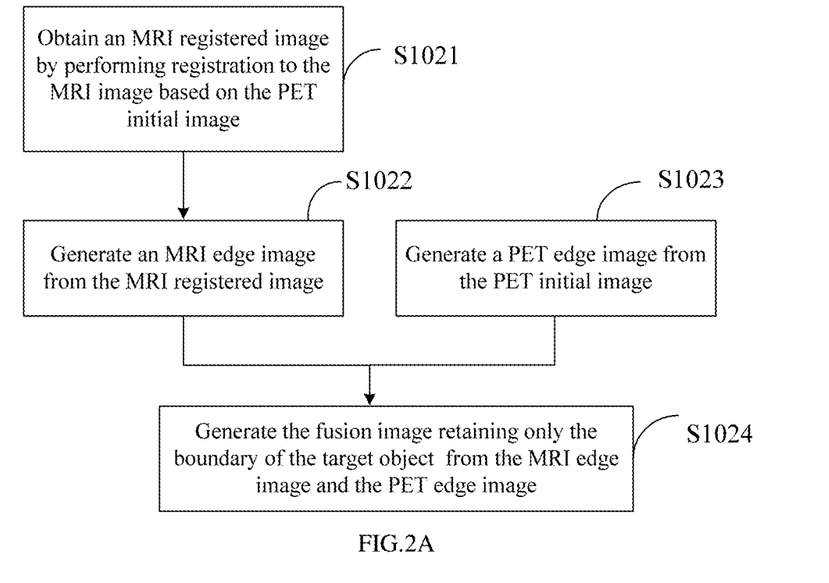
FIG. 2A is a flowchart illustrating a process of a method of generating a fusion image of an edge according to an example of the present disclosure.

At block S1021, an MRI registered image is obtained by performing registration for the MRI image based on the PET initial image.

Image registration is the process of transforming different sets of data into one coordinate system. Registration is necessary in order to be able to compare or integrate the data obtained from these different measurements. Since the PET initial image and the MRI image are two images obtained at different time, by different devices or in different conditions, it is needed to perform registration for the MRI image based on the PET initial image. For example, the MRI image is preprocessed first. The process manners may include image gray processing, image enhancement, image interpolation, or image geometric transformation. Then, the PET initial image is used as a fixed image, and the processed MRI image is used as a floating image. An MRI registered image may be spatially aligned with the PET initial image after a finite number of geometric transformations by rigid or elastic matching. Through registration, the MRI registered image may have basically same resolution as the PET initial image, and the target object in the MRI registered image may have basically same position as in the PET initial image, and so on. In this way, the two images can be easily fused at subsequently blocks.

Figure 3:
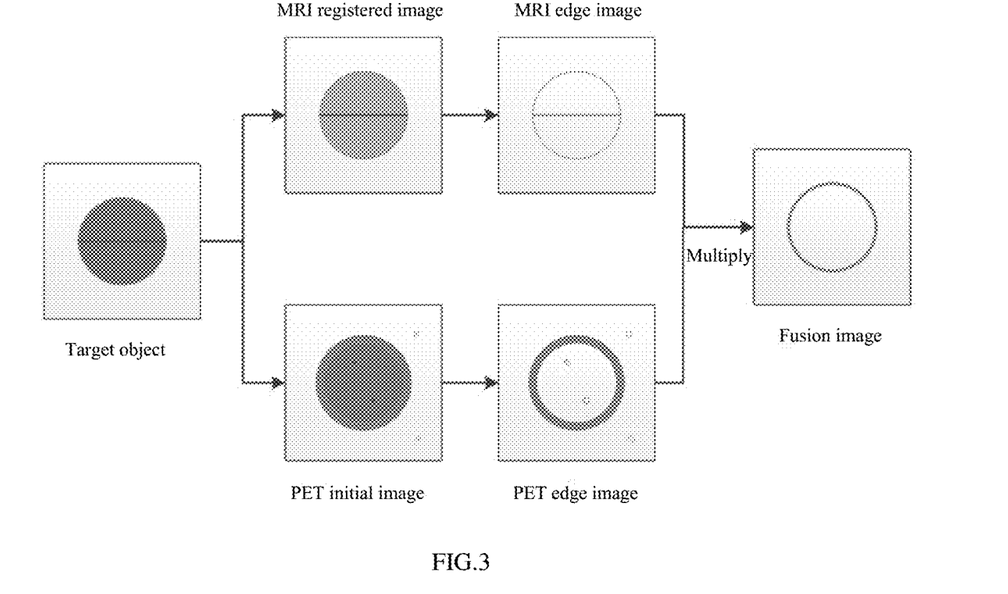
FIG. 3 is a schematic diagram illustrating a formation of a fusion image for an edge according to an example of the present disclosure.

FIG. 3 is a schematic diagram illustrating a formation of a fusion image. A middle circle in the leftmost image refers to an organ tissue as a target object, and a horizontal line in the circle refers to texture information, which does not affect tissue metabolism; an upper image in the second column in the FIG. 3 refers to the MRI registered image, and a lower image in the second column refers to the PET initial image.

At block S1022, an MRI edge image is generated from the MRI registered image, where the MRI edge image is composed of first edge pixels in the MRI registered image, a pixel value of each of the first edge pixels has a sharp change with respect to at least one adjacent pixel of the first edge pixel, and the edge formed by the first edge pixels includes a boundary of the target object.

Figure 2B:
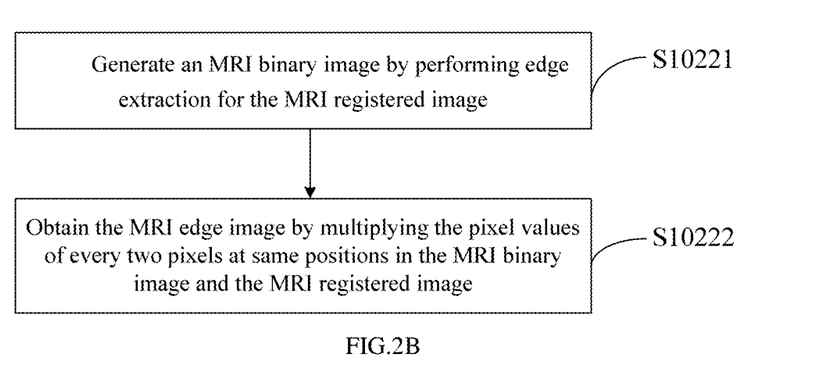
FIG. 2B is a flowchart illustrating a specific process of block S1022 shown in FIG. 2A according to an example of the present disclosure.

Since edge pixels are extracted from the MRI registered image at this block, as shown in FIG. 2B, the block S1022 may specifically include block S10221 and block S10222.

At block S10221, an MRI binary image is generated by performing edge extraction for the MRI registered image, where the MRI binary image is composed of first pixels having a pixel value of 1 and second pixels having a pixel value of 0.

The pixels composing the edge may be extracted from the MRI registered image by adopting an edge detection method such as a Roberts operator or an image segmentation method such as gradient segmentation plus a corresponding mathematical operation. The extracted edge herein may include a boundary and a texture (e.g. a texture within a metabolism region of the target object) of the target object. In this way, pixel values corresponding to the edge pixels are all 1 and pixel values of other pixels are all 0, thereby forming an MRI binary image.

At block S10222, an MRI edge image is obtained by multiplying pixel values of pixels at same positions in the MRI binary image and the MRI registered image.

An image with an edge may be extracted from the MRI registered image by multiplying a pixel value of each of the pixels in the MRI binary image by a pixel value of the pixel in the MRI registered image in the same position. In the present disclosure, this image with an edge is referred to as the MRI edge image. It is noted that gray values in the edge region of the MRI edge image are actual gray values corresponding to the MRI registered image. As shown in FIG. 3, an upper image in the third column refers to the MRI edge image, where a circle in the MRI edge image refers to a boundary of the target object, and a straight line in the middle of the circle refers to a texture of a metabolism region of the target object.

At block S1023, a PET edge image is generated from the PET initial image, where the PET edge image is composed of second edge pixels in the PET initial image, and a pixel value of each of the second edge pixels has a sharp change with respect to at least one adjacent pixel of the second edge pixel, and the edge formed by the second edge pixels includes a boundary of the target object.

Figure 2C:
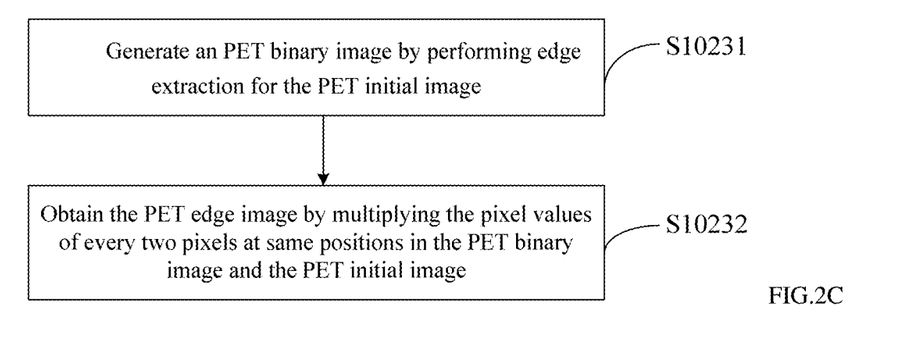
FIG. 2C is a flowchart illustrating a specific process of block S1023 shown in FIG. 2A according to an example of the present disclosure.

Similar to block S1022, edge pixels are extracted from the PET initial image at this block. Thus, as shown in FIG. 2C, block S1023 may specifically include block S10231 and block S10232.

At block S10231, an MRI binary image is generated by performing edge extraction for the PET initial image, where the MRI binary image is composed of first pixels having a pixel value of 1 and second pixels having a pixel value of 0.

The pixels composing the edge may be extracted from the PET initial image by adopting an edge detection method such as a Roberts operator or an image segmentation method such as gradient segmentation plus a corresponding mathematical operation. The extracted edge herein may include a boundary and a noise of the target object. In this way, the pixel values corresponding to the edge pixels are all 1, and the pixel values of other pixels are all 0, thereby forming a PET binary image.

At block S10232, a PET edge image is obtained by multiplying the pixel values of pixels at same positions in the PET binary image and the PET initial image.

An image with an edge may be extracted from the PET initial image by multiplying a pixel value of each of the pixels in the PET binary image by a pixel value of the pixel in the PET initial image in the same position. In the present disclosure, this image with an edge is referred to as the PET edge image. It is noted that gray values in the edge region of the PET edge image are actual gray values corresponding to the PET initial image. As shown in FIG. 3, a lower image in the third column refers to the PET edge image, where a big circle in the PET edge image refers to a boundary of the target object, and a small circle refers to noise of the image.

At block S1024, a fusion image retaining only a boundary of the target object is determined from the MRI edge image and the PET edge image.

Since the MRI registered image has a high spatial resolution, high spatial texture information and noise effect is not significant, the MRI edge image obtained by performing edge extraction for the MRI registered image has a clear boundary, clear texture and noise is not affected significantly. However, since the PET initial image has a relatively low resolution and is obviously affected by noise, the PET edge image obtained by performing edge extraction for the PET initial image has a low defined boundary and is significantly affected by noise. As shown in FIG. 3, the line of the big circle in the PET edge image is thicker than that in the MRI edge image.

Based on different features of the MRI edge image and the PET edge image, a fusion image with only a clear boundary of the target object may be obtained by fusing the two images. The clear boundary is exactly what the PET initial image lacked compared to the MRI image. The image fusion may be specifically performed by one of two implementations as follows.

In the first possible implementation, block S1024 may specifically include: generating the fusion image by performing normalization to the MRI edge image based on pixel values of each of pixels in the MRI edge image, and multiplying each normalized pixel value by a pixel value of a pixel at same position in the PET edge image. In this implementation, the pixel values of each of the pixels in the MRI edge image are in a range of [0,1] by normalization; then, for every two pixels at same positions in the MRI edge image and the PET edge image, the fusion image retaining only the clear boundary may be generated by multiplying the normalized pixel value of the pixel in the MRI edge image by the pixel value of the pixel in the PET edge image.

In the second possible implementation, block S1024 may specifically include: generating the fusion image by multiplying pixel values of every two pixels at same positions in the MRI edge image and the PET edge image and dividing each multiplied pixel value by the maximum pixel value in the MRI edge image. In this implementation, for every two pixels at same positions in the MRI edge image and the PET edge image, the fusion image retaining only the clear boundary may be generated by multiplying the pixel value of the pixel in the MRI edge image by the pixel value of the pixel in the PET edge image and then dividing each multiplied pixel value by the maximum pixel value in the MRI edge image.

As shown in FIG. 3, the rightmost image is the fusion image, and the image inherits a characteristic of the clear boundary of the MRI edge image. Since the correlation between the positions of the texture in the MRI image and the positions of the noise in the PET image is small, the texture and the noise may effectively be reduced by the fusion.

At block S103, a PET reconstructed image is obtained by combining the PET initial image with the fusion image, where the definition of the boundary of the target object in the PET reconstructed image is higher than that in the PET initial image.

At this block, the fusion image is applied to the PET initial image, thereby improving the boundary blurring of the PET initial image. In this example, it may be implemented by performing wavelet transform and wavelet inverse transform. For convenience of understanding, the process of performing wavelet transform and wavelet inverse transform will be described before describing a specific implementation at this block.

Figure 4:
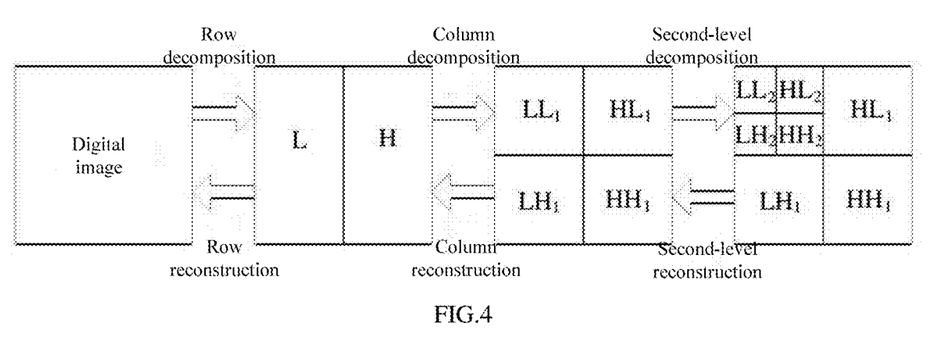
FIG. 4 is a schematic diagram illustrating a process of performing wavelet transform and wavelet inverse transform according to an example of the present disclosure.

As shown in FIG. 4, the process of performing wavelet transform may be specifically a process of decomposing an image, which may include the followings. First, each row of the original digital image is first-level decomposed, and the low-frequency component L and the high-frequency component H of the wavelet domain in the horizontal direction are obtained. Then each column of the obtained row component is first-level decomposed to obtain a number of components for the digital image. The components include a component LL of low-frequency in both horizontal and vertical directions, a component LH of low-frequency in the horizontal direction and high-frequency in the vertical direction LH, a component HL of high-frequency in the horizontal direction and low-frequency in the vertical direction, and a component HH of high-frequency in both the horizontal and vertical directions. The processes of decomposition of the second level or higher level are similar to the above process, which will not be repeated herein. The process of performing wavelet inverse transform is specifically a process of reconstructing an image, including performing wavelet inverse transform for each column of components in a wavelet domain and then performing wavelet inverse transform for each row of components of the transformed data to obtain a reconstructed digital image.

Figure 5:
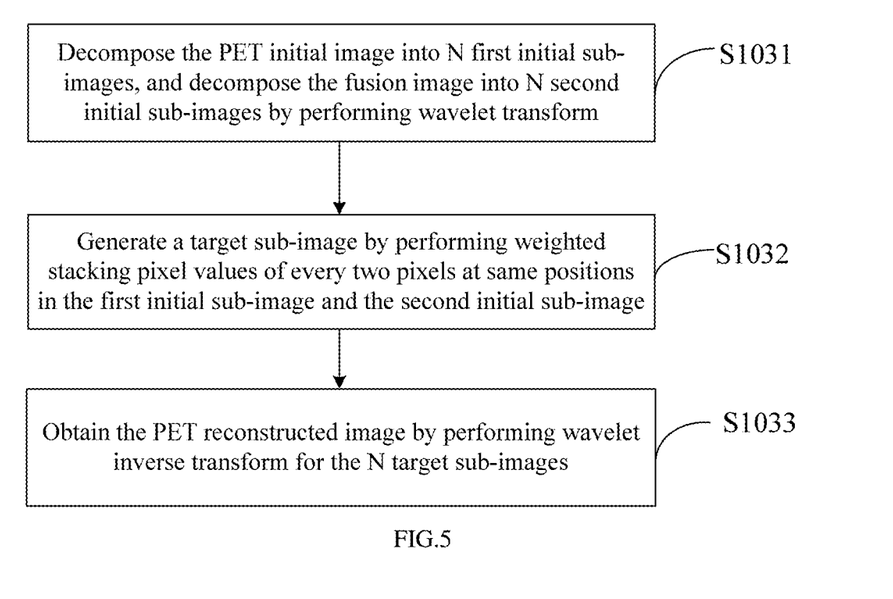
FIG. 5 is a flowchart illustrating a specific process of block S103 shown in FIG. 1 according to an example of the present disclosure.

In an example of the present disclosure, block S103 may specifically include block S1031 to block S1033 as follows. FIG. 5 is a flowchart illustrating a specific generation method of block S103.

At block S1031, the PET initial image is decomposed into N first initial sub-images with different frequency characteristics and the fusion image is decomposed into N second initial sub-images with different frequency characteristics by wavelet transform, where $N=2^n$, and n is an integer greater than or equal to 1.

Local variation features of an image may be fully reflected by decomposing one image into a series of sub-images for different frequency bands through the wavelet transform. Therefore, same wavelet decomposition may be performed for two different images respectively, and different decomposition layers and different frequency bands decomposed from the two images may be processed respectively, and finally detailed information of one image are combined into the other image.

Figure 6:
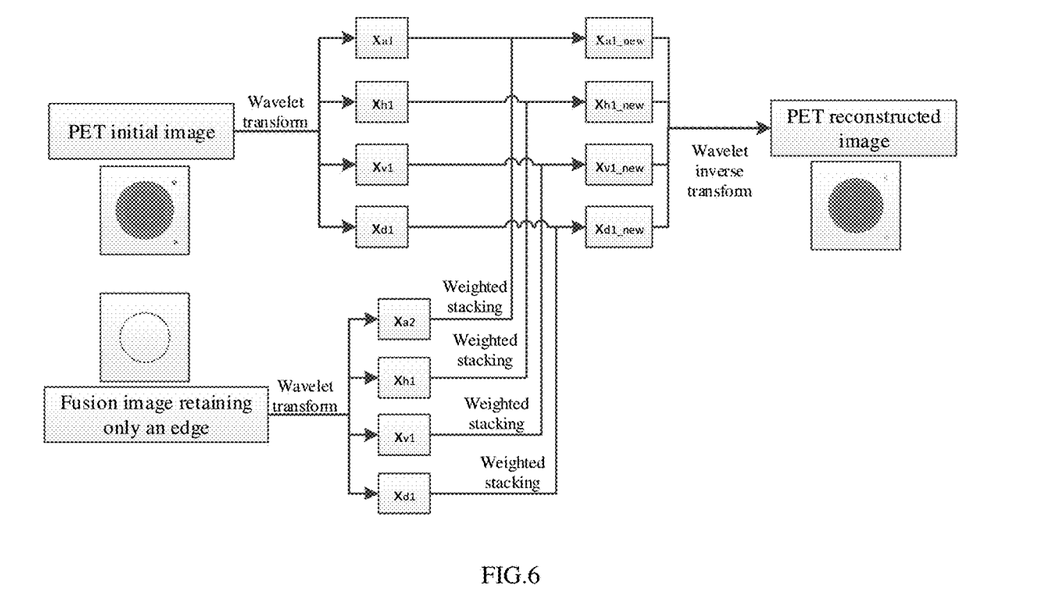
FIG. 6 is a schematic diagram illustrating forming a PET updated image according to an example of the present disclosure.

Specifically, corresponding low-frequency sub-images and high-frequency sub-images may be obtained respectively by performing the same wavelet transform for the fusion image retaining a clear target object boundary and the PET initial image respectively in some examples. As shown in FIG. 6, if first-level wavelet decomposition is performed for the PET initial image and the fusion image respectively, one low-frequency sub-image and three high-frequency sub-images are obtained, where $x_{a1}$ refers to a low-frequency sub-image of the PET initial image, $x_{h1}$, $x_{v1}$ and $x_{d1}$ refer to three high-frequency sub-images of the PET initial image, $x_{a2}$ refers to a low-frequency sub-image of the fusion image, $x_{h2}$, $x_{v2}$ and $x_{d2}$ refer to three high-frequency sub-images of the fusion image.

It is noted that a low-frequency part of an image represents a background of the image and information of the metabolism region of the target object, but a high-frequency part represents boundaries and detailed information of the target object. Therefore, a pixel value of the low-frequency sub-image of the fusion image is very small or may be ignored, but a pixel value of the high-frequency sub-image of the fusion image is relatively large.

At block S1032, A target sub-image is generated by performing weighted stacking pixel values of every two pixels at same positions in each of the first initial sub-images and one of the second initial sub-images which has same frequency characteristic as the first initial sub-image.

A new sub-image may be obtained by performing weighted stacking for each pair of sub-images with same frequency characteristics decomposed from the PET initial image and the fusion image by directly adding or performing e-exponent weighting, or the like. For example, as shown in FIG. 6, a new low-frequency sub-image $x_{a1\_new}$ may be obtained by performing weighted stacking for low-frequency sub-images $x_{a1}$ and $x_{a2}$, a new high-frequency sub-image $x_{h1\_new}$ may be obtained by performing weighted stacking for high-frequency sub-images $x_{h1}$ and $x_{h2}$, a new high-frequency sub-image $x_{v1\_new}$ may be obtained by performing weighted stacking for high-frequency sub-images $x_{v1}$ and $x_{v2}$, and a new high-frequency sub-image $x_{d1\_new}$ may be obtained by performing weighted stacking for high-frequency sub-images $x_{d1}$ and $x_{d2}$. For convenience of description, each new low-frequency sub-image or each new high-frequency sub-image is referred to as a target sub-image. Through this block, N target sub-images can be obtained.

At block S1033, the PET reconstructed image of the target object is generated by performing wavelet inverse transform for the N target sub-images.

A new image may be reconstructed by performing wavelet inverse transform for a series of sub-images with different frequency characteristics. Therefore, an PET image may be obtained by performing wavelet inverse transform for the N target sub-images generated in the block S1032. The PET image, which is the PET reconstructed image, will inherit the characteristic of the clear boundary of the fusion image. Further, since the fusion image contains smaller noise, weight of high-frequency components such as an organ boundary of the PET reconstructed image is increased by the fusion image and weight of the noise is reduced accordingly, so that the noise of the PET reconstructed image is reduced to some extent comparing with the PET initial image.

In addition to the wavelet transform and the wavelet inverse transform, a PET reconstructed image may also be generated by Fourier transform or discrete cosine transform, or the like in some examples. However, since an image may be decomposed by the wavelet transform into low-frequency sub-images and high-frequency sub-images to facilitate performing calculation respectively, the image processing effect is better.

It is noted that the PET initial image at block S101 may be a relatively good image obtained by adopting a common iteration algorithm and stopping iteration after a constraint condition is met. In this case, the above PET reconstructed image obtained at block S103 may be directly used as a final PET reconstructed image.

However, the PET initial image at block S101 may also be a relatively poor image obtained by adopting a common iteration algorithm and stopping iteration without meeting a constraint condition. In this case, the followings may be further included after block S103 in some examples of the present disclosure.

When the PET reconstructed image does not satisfy a preset constraint condition, reconstructing a new PET reconstructed image from the PET reconstructed image by performing M iterative reconstructions based on a preset iterative reconstruction algorithm, wherein M is an integer greater than or equal to 1.

When the new PET reconstructed image satisfies the preset constraint condition or the number of times of iterative reconstruction M reaches a preset threshold, outputting the new PET reconstructed image as a final PET reconstructed image. Such optimization may be referred to as iterative reconstruction.

In some examples of the present disclosure, the following may be further included after block S103.

When the PET reconstructed image does not satisfy a preset constraint condition, regenerating a new PET reconstructed image by using the PET reconstructed image as a new PET initial image. When the new PET reconstructed image satisfies the preset constraint condition or the number of times of regeneration reaches a preset threshold, outputting the new PET reconstructed image as a final PET reconstructed image. Such optimization may be referred to as cyclic reconstruction.

For example, the image obtained after performing several iterations based on a traditional iterative algorithm (such as MLEM and ART) at block S101 may be taken as the PET initial image, and the PET reconstructed image is updated by performing block S102 and block S103. In the case that the updated PET reconstructed image still does not satisfy a constraint condition, the updated PET reconstructed image may be reused as the PET initial image for performing next cyclic reconstruction and/or reused as the input image for performing next iterative reconstruction. Further, several iterative reconstructions and/or cyclic reconstructions may be performed until a reconstruction result satisfies the preset constraint condition or the set number of times of iterations or cycles is reached. In this way, the finally-obtained PET reconstructed image may have a clear organ boundary and can suppress noises caused by a traditional iteration algorithm to some extent, so that the quality of the image can be significantly improved.

A PET initial image and an MRI image may be generated for a same target object, for example, for an organ of a patient. Then, a fusion image retaining only a clear organ boundary may be obtained by fusing characteristics of the MRI image and the PET initial image, for example, by inheriting a characteristic of a clear organ boundary in the MRI image and removing texture interference from the MRI image based on the PET initial image. Next, the definition of the organ boundary in the PET initial image may be increased by combining the PET initial image with the fusion image, thereby effectively improving the quality of the PET reconstructed image.

Further, since the fusion image contains smaller noise, when a characteristic of a high-resolution boundary of the fusion image is added to the PET initial image, the weight of the noise in the PET reconstructed image will be relatively reduced, thereby reducing the noise impact in the PET reconstructed image.

Figure 7A:
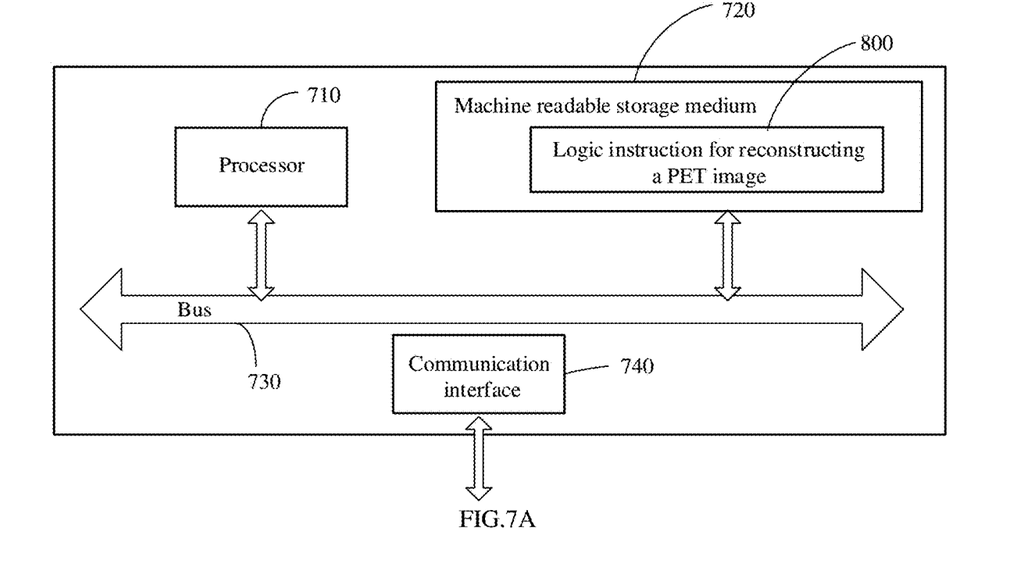
FIG. 7A is a schematic diagram illustrating a hardware structure of a PET image reconstruction device according to an example of the present disclosure.

FIG. 7A is a schematic diagram illustrating a hardware structure of a PET image reconstruction device according to an example of the present disclosure. The device includes a processor 710 and a machine readable storage medium 720, where the processor 710 and the machine readable storage medium 720 are usually connected with each other via an internal bus 730. In other possible implementations, the device may also include an external interface 740 to communicate with other devices or components.

In different examples, the machine readable storage medium 720 may be: a Radom Access Memory (RAM), a volatile memory, a non-volatile memory, a flash memory, a storage drive (e.g. hard disk drive), a solid state hard disk, any type of storage disk (e.g., compact disk, Digital Video Disk (DVD)), or a similar storage medium, or a combination thereof.

Figure 7B:
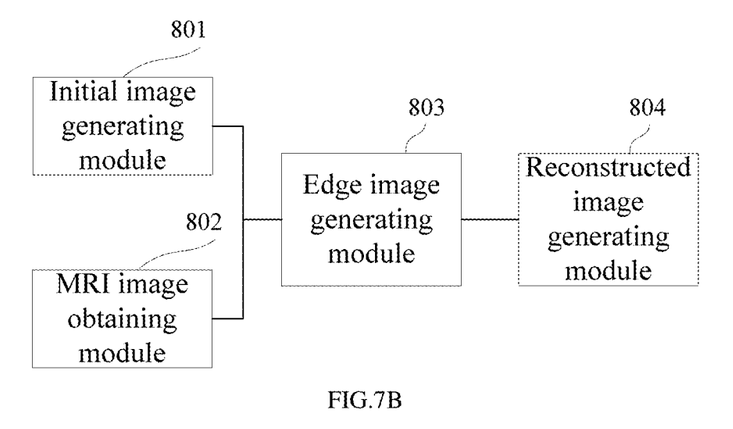
FIG. 7B is a schematic diagram illustrating a functional module of control logic for reconstructing a PET image according to an example of the present disclosure.

Further, control logic 800 for reconstructing a PET image is stored on the machine readable storage medium 720. FIG. 7B is a schematic diagram illustrating a functional module of the control logic for executing PET image reconstruction according to an example of the present disclosure. The control logic may functionally include: an initial image generating module 801, an MRI image obtaining module 802, an edge image generating module 803 and a reconstructed image generating module 804.

The initial image generating module 801 is configured to reconstruct a PET initial image from PET data obtained by scanning on a target object.

The MRI image obtaining module 802 is configured to obtain an MRI image for the target object generated by an MRI device.

The edge image generating module 803 is configured to generate a fusion image retaining only a boundary of the target object based on the PET initial image and the MRI image of the target object, where the definition of the boundary of the target object in the fusion image is higher than that in the PET initial image.

The reconstructed image generating module 804 is configured to generate a PET reconstructed image by combining the PET initial image with the fusion image, where the definition of the boundary of the target object in PET reconstructed image is higher than that in the PET initial image.

The process of executing the control logic 800 by a PET imaging device will be described below with software implementation as an example. In this example, the control logic 800 of the present disclosure should be understood as computer instructions stored in the machine readable storage medium 720. When the CPU 710 on the PET image reconstruction device of the present disclosure executes the control logic 800, the CPU 710 may perform the following operations by invoking instructions corresponding to the control logic 800 stored on the machine readable storage medium 720.

A PET initial image is reconstructed from PET data obtained by scanning on a target object.

An MRI image for the target object generated by an MRI device is obtained.

A fusion image retaining only a boundary of the target object is generated based on the PET initial image and the MRI image, where the definition of the boundary of the target object in the fusion image is higher than that in the PET initial image.

A PET reconstructed image is obtained by combining the PET initial image with the fusion image, where the definition of the boundary of the target object in the PET reconstructed image is higher than that in the PET initial image.

When the processor generates the fusion image by reading machine-readable instructions corresponding to the control logic in a storage medium, the following may be specifically included.

An MRI registered image is obtained by performing registration for the MRI image based on the PET initial image.

An MRI edge image is generated from the MRI registered image, wherein the MRI edge image is composed of first edge pixels in the MRI registered image, and a pixel value of each of the first edge pixels has a sharp change with respect to at least one adjacent pixel of the first edge pixel.

A PET edge image is generated from the PET initial image, wherein the PET edge image is composed of second edge pixels in the PET initial image, and a pixel value of each of the second edge pixels has a sharp change with respect to at least one adjacent pixel of the second edge pixel.

A fusion image retaining only the boundary of the target object is determined from the MRI edge image and the PET edge image.

When the processor generates the MRI edge image by reading machine-readable instructions corresponding to the control logic in a storage medium, the followings may be specifically included.

An MRI binary image is generated by performing edge extraction for the MRI registered image, wherein the MRI binary image is composed of first pixels having a pixel value of 1 and second pixels having a pixel value of 0.

The MRI edge image is obtained by multiplying the pixel values of every two pixels at same positions in the MRI binary image and the MRI registered image.

When the processor generates the PET edge image by reading machine-readable instructions corresponding to the control logic in a storage medium, the followings may be specifically included.

A PET binary image is generated by performing edge extraction for the PET initial image, wherein the PET binary image is composed of first pixels having a pixel value of 1 and second pixels having a pixel value of 0.

The PET edge image is obtained by multiplying the pixel values of every two pixels at same positions in the PET binary image and the PET initial image.

When the processor generates the fusion image by reading machine-readable instructions corresponding to the control logic in a storage medium, the followings may be specifically included.

Normalization is performed to the MRI edge image based on pixel values of each of pixels in the MRI edge image.

The fusion image is generated by multiplying pixel values of every two pixels at same positions in the normalized MRI edge image and the PET edge image.

When the processor generates the fusion image by reading machine-readable instructions corresponding to the control logic in a storage medium, the followings may be specifically included. The pixel values of every two pixels at same positions in the MRI edge image and the PET edge image are multiplied.

The fusion image is generated by dividing the multiplied pixel value by the maximum pixel value in the MRI edge image.

When the processor generates the PET reconstructed image by reading machine-readable instructions corresponding to the control logic in a storage medium, the followings may be specifically included.

The PET initial image is decomposed into N first initial sub-images with different frequency characteristics by performing wavelet transform, wherein $N=2^n$, and n is an integer greater than or equal to 1.

The fused image is decomposed into N second initial sub-images with different frequency characteristics by performing wavelet transform.

A target sub-image is generated by performing weighted stacking pixel values of every two pixels at same positions in each of the first initial sub-images and one of the second initial sub-images which has same frequency characteristic as the first initial sub-image The PET reconstructed image is obtained by performing wavelet inverse transform for the N target sub-images.

Further, when the PET reconstructed image does not satisfy a preset constraint condition, the processor will process the following steps by reading machine-readable instructions corresponding to the control logic in a storage medium.

When the PET reconstructed image does not satisfy a preset constraint condition, a new PET reconstructed image is reconstructed from the PET reconstructed image by performing M iterative reconstructions based on a preset iterative reconstruction algorithm, wherein M is an integer greater than or equal to 1.

When the new PET reconstructed image satisfies the preset constraint condition or the number of times of iterative reconstruction M reaches a preset threshold, the new PET reconstructed image is output as a final PET reconstructed image.

Further, when the PET reconstructed image does not satisfy a preset constraint condition, the processor will process the following steps by reading machine-readable instructions corresponding to the control logic in a storage medium.

When the PET reconstructed image does not satisfy a preset constraint condition, a new PET reconstructed image is regenerated by using the PET reconstructed image as a new PET initial image When the new PET reconstructed image satisfies the preset constraint condition or the number of times of regeneration reaches a preset threshold, the new PET reconstructed image is output as a final PET reconstructed image.

A PET initial image and an MRI image may be generated for a same target object, for example, for an organ of a patient. Then, a fusion image retaining only a clear organ boundary may be obtained by fusing characteristics of the MRI image and the PET initial image, for example, by inheriting a characteristic of a clear organ boundary in the MRI image and removing texture interference from the MRI image based on the PET initial image. Next, the definition of the organ boundary in the PET initial image may be increased by combining the PET initial image with the fusion image, thereby effectively improving the quality of the PET reconstructed image.

Further, since the fusion image contains smaller noise, when a characteristic of a high-resolution boundary of the fusion image is added to the PET initial image, the weight of the noise in the PET reconstructed image will be relatively reduced, thereby reducing the noise impact in the PET reconstructed image.

Further, the theme and functional operations described in the above examples may be implemented by using a digital electronic circuit, a tangibly-embodied computer software or firmware, a computer hardware including a structure of the present disclosure and an equivalent structure, or one or more combinations thereof. Examples of the theme described in the present disclosure may be implemented as one or more computer programs, namely, as one or more modules in computer program instructions encoded on a tangible non-transitory program carrier to be executed by a data processing device or to control operations of a data processing device. Alternatively or additionally, the program instructions may be encoded on an artificially generated transmission signal, such as electric, optical and electromagnetic signals generated by a machine and the signal is generated to encode and transmit information to an appropriate receiver device for execution by a data processing device. The computer storage medium may be a machine readable storage device, a machine readable storage substrate, a random or serial access memory device, or one or more combinations thereof.

Processing and logical flows described in the present disclosure may be executed by one or more programmable computers for executing one or more computer programs, to perform corresponding functions by operating based on input data and generating an output. The processing and logical flows may also be executed by a dedicated logical circuit, such as a Field Programmable Gate Array (FPGA) or an Application Specific Integrated Circuit (ASIC), and the device may also be implemented as a dedicated logical circuit.

Computers applicable to executing computer programs include, for example, a universal and/or dedicated microprocessor, or any other type of central processing unit. Usually, the central processing unit will receive instructions and data from a read-only memory and/or a random access memory. Basic components of the computer include a central processing unit for implementing or executing instructions and one or more memory devices storing instructions and data. Usually, the computer may also include one or more mass storage devices for storing data, such as a magnetic disk, a magneto-optical disk or an optical disk, or the computer will be operably coupled to the mass storage device to receive data from the mass storage device or transmit data to the mass storage device, or to do both. However, the computer may not necessarily have such device. Further, the computer may be embedded in another device, such as a mobile phone, a Personal Digital Assistant (PDA), a mobile audio or video player, a Global Positioning System (GPS) receiver, or a portable storage device such as a Universal Serial Bus (USB) flash drive, which are only illustrated as examples.

Computer readable mediums applicable to storing computer program instructions and data include all forms of non-volatile memories, media and memory devices, such as a semiconductor memory device (e.g., an Erasable Programmable Read-Only Memory (EPROM), an Electrically Erasable Programmable Read-Only Memory (EEPROM), and a flash memory device), a magnetic disk (e.g., an internal hard disk or a mobile disk), a magneto-optical disk and CD-ROM and DVD-ROM disks. The processor and the memory may be supplemented by or incorporated in a dedicated logical circuit.

For simplicity and illustrative purposes, the present disclosure is described by referring mainly to examples thereof. In the above descriptions, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

The above description merely provides examples of the present disclosure and is not intended to limit the present disclosure in any form. Although the present disclosure is disclosed by the above examples, the examples are not intended to limit the present disclosure. Those skilled in the art, without departing from the scope of the technical scheme of the present disclosure, may make a plurality of changes and modifications of the technical scheme of the present disclosure by the method and technical content disclosed above.

Therefore, without departing from the scope of the technical scheme of the present disclosure, based on technical essences of the present disclosure, any simple alterations, equal changes and modifications should fall within the protection scope of the technical scheme of the present disclosure. Accordingly, other embodiments are within the scope of the following claims.

What is claimed is:

1. A method of reconstructing a Positron Emission Tomography (PET) image, comprising:
   obtaining PET data by scanning a target object with a PET device,
   obtaining Magnetic Resonance Imaging (MRI) data by scanning the target object with an MRI device,
   reconstructing a PET initial image and an MRI image from the PET data and the MRI data respectively;
   generating a fusion image retaining only a boundary of the target object based on the PET initial image and the MRI image, wherein definition of the boundary of the target object in the fusion image is higher than that in the PET initial image; and
   obtaining a PET reconstructed image by combining the PET initial image with the fusion image, wherein the definition of the boundary of the target object in the PET reconstructed image is higher than that in the PET initial image;

wherein obtaining the PET reconstructed image comprising:

decomposing the PET initial image into N first initial sub-images with different frequency characteristics by performing wavelet transform, wherein N=2$^n$, and n is an integer greater than or equal to 1;

decomposing the fusion image into N second initial sub-images with different frequency characteristics by performing wavelet transform;

generating a target sub-image by performing weighted stacking pixel values of every two pixels at same positions in each of the first initial sub-images and one of the second initial sub-images which has same frequency characteristic as the first initial sub-image; and obtaining the PET reconstructed image by performing wavelet inverse transform to the N target sub-images.

2. The method of claim 1, wherein generating the fusion image comprises:

obtaining an MRI registered image by performing registration to the MRI image based on the PET initial image;

generating an MRI edge image from the MRI registered image, wherein the MRI edge image is composed of first edge pixels in the MRI registered image, and a pixel value of each of the first edge pixels has a sharp change with respect to at least one adjacent pixel of the first edge pixel;

generating a PET edge image from the PET initial image, wherein the PET edge image is composed of second edge pixels in the PET initial image, and a pixel value of each of the second edge pixels has a sharp change with respect to at least one adjacent pixel of the second edge pixel; and generating the fusion image retaining only the boundary of the target object from the MRI edge image and the PET edge image.

3. The method of claim 2, wherein generating the MRI edge image comprises:

generating an MRI binary image by performing edge extraction for the MRI registered image, wherein the MRI binary image is composed of first pixels having a pixel value of 1 and second pixels having a pixel value of 0; and obtaining the MRI edge image by multiplying pixel values of every two pixels at same positions in the MRI binary image and the MRI registered image.

4. The method of claim 2, wherein generating the PET edge image comprises:

generating a PET binary image by performing edge extraction for the PET initial image, wherein the PET binary image is composed of first pixels having a pixel value of 1 and second pixels having a pixel value of 0; and obtaining the PET edge image by multiplying pixel values of every two pixels at same positions in the PET binary image and the PET initial image.

5. The method of claim 2, wherein generating the fusion image comprises:

performing normalization to the MRI edge image based on pixel values of each of pixels in the MRI edge image; and generating the fusion image by multiplying pixel values of every two pixels at same positions in the normalized MRI edge image and the PET edge image.

6. The method of claim 2, wherein generating the fusion image comprises:

multiplying pixel values of every two pixels at same positions in the MRI edge image and the PET edge image; and generating the fusion image by dividing the multiplied pixel value with the maximum pixel value in the MRI edge image.

7. The method of claim 1, further comprising:

when the PET reconstructed image does not satisfy a preset constraint condition, reconstructing a new PET reconstructed image from the PET reconstructed image by performing M iterative reconstructions based on a preset iterative reconstruction algorithm, wherein M is an integer greater than or equal to 1; and when the new PET reconstructed image satisfies the preset constraint condition or the number of times of iterative reconstruction M reaches a preset threshold, outputting the new PET reconstructed image as a final PET reconstructed image.

8. The method of claim 1, further comprising:

when the PET reconstructed image does not satisfy a preset constraint condition, regenerating a new PET reconstructed image by using the PET reconstructed image as a new PET initial image; and when the new PET reconstructed image satisfies the preset constraint condition or the number of times of regeneration reaches a preset threshold, outputting the new PET reconstructed image as a final PET reconstructed image.

9. A PET image reconstruction device comprising a processor, wherein by reading and executing machine executable instructions corresponding to a control logic for PET imaging and stored on a machine readable storage medium, the processor is caused to:

obtain PET data by scanning a target object with a PET device, and reconstruct a PET initial image from the PET data;

obtain an MRI image for the target object generated by an MRI device;

generate a fusion image retaining only a boundary of the target object based on the PET initial image and the MRI image, wherein definition of the boundary of the target object in the fusion image is higher than that in the PET initial image; and obtain a PET reconstructed image by combining the PET initial image with the fusion image, wherein the definition of the boundary of the target object in the PET reconstructed image is higher than that in the PET initial image;

wherein when obtaining the PET reconstructed image, the machine executable instructions cause the processor to:

decompose the PET initial image into N first initial sub-images with different frequency characteristics by performing wavelet transform, wherein N=2$^n$, and n is an integer greater than or equal to 1;

decompose the fusion image into N second initial sub-images with different frequency characteristics by performing wavelet transform;

generate a target sub-image by performing weighted stacking pixel values of every two pixels at same positions in each of the first initial sub-images and one of the second initial sub-images which has same frequency characteristic as the first initial sub-image; and obtain the PET reconstructed image by performing wavelet inverse transform to the N target sub-images.

10. The device of claim 9, wherein when generating the fusion image, the machine executable instructions cause the processor to:

obtain an MRI registered image by performing registration for the MRI image based on the PET initial image;

generate an MRI edge image from the MRI registered image, wherein the MRI edge image is composed of first edge pixels in the MRI registered image, and a pixel value of each of the first edge pixels has a sharp change with respect to at least one adjacent pixel of the first edge pixel;

generate a PET edge image from the PET initial image, wherein the PET edge image is composed of second edge pixels in the PET initial image, and a pixel value of each of the second edge pixels has a sharp change with respect to at least one adjacent pixel of the second edge pixel; and generate the fusion image retaining only the boundary of the target object from the MRI edge image and the PET edge image.

11. The device of claim 10, wherein when generating the MRI edge image, the machine executable instructions cause the processor to:

generate an MRI binary image by performing edge extraction for the MRI registered image, wherein the MRI binary image is composed of first pixels having a pixel value of 1 and second pixels having a pixel value of 0; and obtain the MRI edge image by multiplying the pixel values of pixels at same positions in the MRI binary image and the MRI registered image.

12. The device of claim 10, wherein when generating the PET edge image, the machine executable instructions cause the processor to:

generate a PET binary image by performing edge extraction for the PET initial image, wherein the PET binary image is composed of first pixels having a pixel value of 1 and second pixels having a pixel value of 0; and obtain the PET edge image by multiplying the pixel values of pixels at same positions in the PET binary image and the PET initial image.

13. The device of claim 10, wherein when generating the fusion image, the machine executable instructions cause the processor to:

perform normalization to the MRI edge image based on pixel values of each of pixels in the MRI edge image; and generate the fusion image by multiplying pixel values of every two pixels at same positions in the normalized MRI edge image and the PET edge image.

14. The device of claim 10, wherein when generating the fusion image, the machine executable instructions cause the processor to:

multiply pixel values of every two pixels at same positions in the MRI edge image and the PET edge image; and generate the fusion image by dividing the multiplied pixel value with the maximum pixel value in the MRI edge image.

15. The device of claim 9, wherein the machine executable instructions further cause the processor to:

when the PET reconstructed image does not satisfy a preset constraint condition, reconstructing a new PET reconstructed image from the PET reconstructed image by performing M iterative reconstructions based on a preset iterative reconstruction algorithm, wherein M is an integer greater than or equal to 1; and when the new PET reconstructed image satisfies the preset constraint condition or the number of times of iterative reconstruction M reaches a preset threshold, outputting the new PET reconstructed image as a final PET reconstructed image.

16. The device of claim 9, wherein the machine executable instructions further cause the processor to:

when the PET reconstructed image does not satisfy a preset constraint condition, regenerating a new PET reconstructed image by using the PET reconstructed image as a new PET initial image; and when the new PET reconstructed image satisfies the preset constraint condition or the number of times of regeneration reaches a preset threshold, outputting the new PET reconstructed image as a final PET reconstructed image.

* * * * *